United States Patent
Zhu et al.

(10) Patent No.: US 7,520,926 B2
(45) Date of Patent: Apr. 21, 2009

(54) SOLVENT-BASED INK COMPOSITION

(75) Inventors: Linfang Zhu, Naperville, IL (US);
Godwin Deng, Schaumburg, IL (US)

(73) Assignee: Videojet Technologies Inc., Wood Dale, IL (US)

( * ) Notice: Subject to any disclaimer, the term of this patent is extended or adjusted under 35 U.S.C. 154(b) by 263 days.

(21) Appl. No.: 11/521,853

(22) Filed: Sep. 15, 2006

(65) Prior Publication Data

US 2008/0066239 A1    Mar. 20, 2008

(51) Int. Cl.
*C09D 11/02* (2006.01)
*C09D 11/08* (2006.01)
*C09D 11/10* (2006.01)
*B41J 2/01* (2006.01)

(52) U.S. Cl. .............. 106/31.27; 106/31.37; 106/31.41; 106/31.44; 106/31.49; 106/31.58; 347/100

(58) Field of Classification Search .............. 106/31.27, 106/31.44, 31.58, 31.37, 31.41, 31.49; 347/100
See application file for complete search history.

(56) References Cited

U.S. PATENT DOCUMENTS

| | | | |
|---|---|---|---|
| 4,024,096 A | 5/1977 | Wachtel | |
| 5,443,628 A | 8/1995 | Loria et al. | |
| 5,594,044 A * | 1/1997 | Yang | 523/160 |
| 5,637,139 A * | 6/1997 | Morelos et al. | 106/31.37 |
| 5,652,286 A * | 7/1997 | Deng | 524/261 |
| 5,693,127 A | 12/1997 | Nigam et al. | |
| 5,800,601 A | 9/1998 | Zou et al. | |
| 5,889,083 A | 3/1999 | Zhu | |
| 6,010,564 A | 1/2000 | Zhu et al. | |
| 6,117,225 A | 9/2000 | Nicolls | |
| 6,117,685 A * | 9/2000 | Omatsu et al. | 436/135 |
| 6,133,342 A | 10/2000 | Mizobuchi et al. | |
| 6,140,391 A | 10/2000 | Zou et al. | |
| 6,210,472 B1 | 4/2001 | Kwan et al. | |
| 6,221,933 B1 | 4/2001 | Zhu et al. | |
| 6,235,829 B1 | 5/2001 | Kwan | |
| 6,251,175 B1 | 6/2001 | Zhu et al. | |
| 6,261,348 B1 | 7/2001 | Kwan et al. | |
| 6,336,964 B1 * | 1/2002 | Omatsu et al. | 106/31.44 |
| 6,372,819 B1 | 4/2002 | Mizobuchi et al. | |
| 6,444,019 B1 | 9/2002 | Zou et al. | |
| 6,478,861 B1 | 11/2002 | Kwan et al. | |
| 6,645,280 B1 | 11/2003 | Zhu et al. | |
| 6,726,756 B1 | 4/2004 | Zou et al. | |
| 6,747,072 B1 | 6/2004 | Siddiqui | |
| 6,908,186 B2 | 6/2005 | Zheng et al. | |
| 6,986,808 B2 | 1/2006 | Fu et al. | |
| 7,025,816 B2 | 4/2006 | Suzuki et al. | |
| 7,041,162 B2 | 5/2006 | Ishizuka et al. | |
| 7,309,388 B2 * | 12/2007 | Zhu et al. | 106/31.4 |
| 2004/0110868 A1 | 6/2004 | Zhu et al. | |
| 2004/0154495 A1 | 8/2004 | Zhu et al. | |
| 2004/0220298 A1 | 11/2004 | Kozee et al. | |
| 2005/0090579 A1 | 4/2005 | Zhu et al. | |
| 2005/0092204 A1 | 5/2005 | Zhu et al. | |
| 2005/0166793 A1 | 8/2005 | Looman et al. | |
| 2005/0248645 A1 | 11/2005 | Jenkins et al. | |
| 2006/0107868 A1 | 5/2006 | Potenza et al. | |
| 2008/0000387 A1 * | 1/2008 | Renner et al. | 106/31.59 |

FOREIGN PATENT DOCUMENTS

| | | |
|---|---|---|
| JP | 57-195775 A | 12/1982 |
| JP | 59-074173 A | 4/1984 |
| JP | 10-306221 A | 11/1988 |
| JP | 02-016171 A | 1/1990 |
| JP | 2003-192930 A | 7/2003 |

OTHER PUBLICATIONS

Anna. "Elasto-Capillary Thinning and Breakup of Model Elastic Liquids," *Journal of Rheology*, 45(1): 115-138 (Jan./Feb. 2001).

Bazilevsky et al., "Effects of Polymeric Additives on Vapor Bubble Dynamics in Thermal Ink Jet Printing," *IS&Ts NIP 14: 1998 International Conference on Digital Printing Technologies*, 15-18 (1998), no month available.

Evans et al., "Optimisation of Ink Jet Droplet Formation Through Polymer Selection," *IS&Ts NIP 15: 1999 International Conference on Digital Printing Technologies*, 78-81 (1999), no month available.

Meyer et al., "Effects of Polymeric Additives on Thermal Ink Jets," *IS&T's NIP 13: 1997 International Conference on Digital Printing Technologies*, 675-680 (1997), no month.

Shield et al., "Drop Formation by DOD Ink-Jet Nozzles: A Comparison of Experiment and Numerical Simulation," *IBM Journal of Research and Development*, 31(1): 96-110 (Jan. 1987).

* cited by examiner

*Primary Examiner*—Helene Klemanski
(74) *Attorney, Agent, or Firm*—Joseph A. Yosick

(57) ABSTRACT

Disclosed is an ink composition, particularly an ink jet ink composition, comprising one or more organic solvents, one or more solvent-soluble binder resins, and a water-insoluble quinone dye, wherein the quinone dye is present in the ink composition in a dissolved state and the ink composition is a single phase ink composition. Also disclosed is a method of printing images on a substrate employing the ink composition.

25 Claims, No Drawings

SOLVENT-BASED INK COMPOSITION

BACKGROUND OF THE INVENTION

The invention relates to ink compositions in general, and ink jet ink compositions in particular. Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream, e.g., electronically, so that the droplets are caused to form the desired printed message on that surface.

The technique of ink jet printing or non-contact printing is particularly well suited for application of characters onto irregularly shaped substrates and surfaces, including, for example, glass, metal, or plastic containers, generally used for holding beverage, cosmetic, pharmaceutical, liquor, and health care products.

The jetting of the ink droplets can be performed in several different ways. In a first type of process called continuous ink-jet printing, the ink stream jetted from an orifice of the print head is broken up, by applying a pressure wave pattern to this orifice, into ink droplets of uniform size and spacing. When the jet break-up mechanism is controlled, an electric charge can be applied to the droplets selectively and reliably as they form from the continuous ink stream. The charged drops passing through an electric field are deflected into a gutter for recuperation, while the uncharged drops proceed directly onto the ink-receiver to form an image or vice versa.

According to a second process the ink droplets can be created by a "drop on demand" method (DOD). A drop-on-demand device ejects ink droplets only when they are needed for imaging on the ink-receiver, thereby avoiding the complexity of drop charging, deflection hardware, and ink collection. In drop-on-demand ink-jet printing, the ink droplet can be formed by means of a pressure wave created by the mechanical motion of a piezoelectric transducer (the "piezo method"), or by means of discrete thermal pulses (the "bubble jet" method, or "thermal jet" method). In another mode of drop-on demand ink jet printing, the ink droplets are created by valves that open and shut independently to produce streams of intermittent ink droplets (the "valve jet" method).

In general, an ink composition should meet certain requirements to be useful for the intended purpose, for example, viscosity, electrical resistivity, solubility and compatibility of the components of the ink composition, and/or the wettability of the substrate by the ink composition. Further, the ink composition is preferably quick-drying and smear resistant. An ink jet ink composition should be capable of passing through the ink jet nozzle or nozzles without clogging and/or permit rapid cleanup of the machine components with minimum effort. The printed message should have good adhesion to the substrate and resist rubbing.

Quinone dyes have been proposed for use in ink jet ink compositions because of their light fastness and color reproduction characteristics. However, some of these ink compositions are water-based ink compositions as they contain water-soluble quinone dyes (e.g., anthraquinone dyes), and therefore, exhibit long ink dry times. Certain other qunione dyes, e.g. anthraquinone dyes, have limited solubility in organic solvents and tend to precipitate out of solution, especially at low temperatures, thereby clogging ink jet printer nozzle openings. There exists, therefore, a need for an ink jet ink composition comprising a quinone dye, which has short dry times and a reduced tendency to clog printer nozzle openings. The present invention provides such an ink composition. The advantages of the present invention as well as additional inventive features will be apparent from the description of the invention provided herein.

BRIEF SUMMARY OF THE INVENTION

The invention provides a single phase ink composition, particularly an ink jet ink composition, comprising an organic solvent and a water-insoluble quinone dye, particularly an anthraquinone or a naphthoquinone dye. The quinone dye is present in the ink composition or ink jet ink composition in a dissolved state. Thus, for example, the invention provides an ink composition, e.g., ink jet ink composition, comprising one or more organic solvents, one or more solvent-soluble binder resins, and a water-insoluble quinone dye, e.g., an anthraquinone or a naphthoquinone dye, wherein the dye is present in the ink composition or ink jet ink composition in a dissolved state and the ink composition or ink jet ink composition is a single phase ink jet ink composition. The invention also provides a method of printing images on a substrate employing the ink composition or ink jet ink composition. The ink composition or the ink jet ink composition of the invention has one or more advantageous properties, e.g., it is free of metals such as chromium and cobalt, and the ink has storage stability and short dry times. Unlike many ink jet colorants, the dye is not a metal complex dye and is considered safer to use. The dye does not precipitate out of solution even at low temperatures. The ink jet ink compositions print without nozzle clogging.

DETAILED DESCRIPTION OF THE INVENTION

The foregoing need has been fulfilled to a great extent by the present invention, which provides an ink composition comprising one or more organic solvents, one or more solvent-soluble binder resins, and a water-insoluble quinone dye, e.g., anthraquinone or naphthoquinone dye, wherein the dye is present in the ink composition in a dissolved state and the ink composition is a single phase ink composition. The ink composition can be any suitable ink composition, for example, letter press or lithographic ink composition, flexographic ink composition, rotogravure ink composition, or ink jet ink composition.

In an embodiment, the invention provides an ink jet ink composition comprising one or more organic solvents, one or more solvent-soluble binder resins, and a water-insoluble quinone dye, e.g., anthraquinone or naphthoquinone dye, wherein the dye is present in the ink jet ink composition in a dissolved state and the ink jet ink composition is a single phase ink jet ink composition.

Any suitable water-insoluble quinone dye, for example, an anthraquinone or a naphthoquinone dye, can be used. The term "water-insoluble" refers to a dye having a solubility less than about 0.5 g/L, for example, less than about 0.1 g/L of water at 25° C. The water-insoluble dye is preferably free of sulfonate groups. Examples of water-insoluble anthraquinone dyes include C.I. Solvent Yellow 100, C.I. Solvent Orange 55, C.I. Solvent Orange 64, C.I. Solvent Orange 65, C.I. Solvent Orange 66, C.I. Solvent Red 52, C.I. Solvent Red 53, C.I. Solvent Red 87, C.I. Solvent Red 111, C.I Solvent Red 114, C.I. Solvent Red 136, C.I. Solvent Red 136, C.I. Solvent Red 137, C.I. Solvent Red 139, C.I. Solvent Red 143, C.I. Solvent Red 144, C.I. Solvent Red 145, C.I. Solvent Red 146, C.I. Solvent Red 147, C.I. Solvent Red 148, C.I. Solvent Red 149, C.I. Solvent Red 150, C.I. Solvent Red 151, C. I. Solvent Violet, C.I. Solvent Violet 11, C.I. Solvent Violet 12, C.I. Solvent Violet 13, C.I. Solvent Violet 14, C.I. Solvent Violet 15, C.I. Solvent Violet 26, C.I. Solvent Violet 28, C.I. Solvent Violet 30, C. I. Solvent Blue 11, C.I. Solvent Blue 12, C.I. Solvent Blue 13, C.I. Solvent Blue 14, C.I. Solvent Blue 15, C.I. Solvent Blue 16, C.I. Solvent Blue 17, C.I. Solvent Blue 18, C.I. Solvent Blue 19, C.I. Solvent Blue 20, C.I. Solvent Blue 21, C.I. Solvent Blue 36, C.I. Solvent Blue 40, C.I. Solvent Blue 41, C.I. Solvent Blue 45, C.I. Solvent Blue 58, C.I. Solvent Blue 63, C.I. Solvent Blue 65, C.I. Solvent Blue 68, C.I. Solvent Blue 69, C.I. Solvent Blue 74, C.I. Solvent Blue 76, C.I. Solvent Blue 78, C.I. Solvent Blue 79, C.I. Solvent Blue 80, C.I. Solvent Blue 82, C.I. Solvent Blue 83, C.I. Solvent Blue 84, C.I. Solvent Blue 85, C.I. Solvent Blue 86, C.I. Solvent Blue 87, C. I. Solvent Green 5, C.I. Solvent Green 6, C.I. Solvent Green 7, C.I. Solvent Green 19, C.I. Solvent Green 20, C.I. Solvent Green 24, C.I. Solvent Green 25, C.I. Disperse Yellow 13, C.I. Disperse Yellow 51, C.I. Disperse Yellow 92, C.I. Disperse Yellow 106, C.I. Disperse Orange 11, C.I. Disperse Orange 81, C.I. Disperse Red 3, C.I. Disperse Red 4, C.I. Disperse Red 9, C.I. Disperse Red 11, C.I. Disperse Red 15, C.I. Disperse Red 22, C.I. Disperse Red 53, C.I. Disperse Red 55, C.I. Disperse Red 59, C.I. Disperse Red 60, Disperse Red 66, Disperse Red 69, Disperse Red 70, Disperse Red 75, Disperse Red 86, Disperse Red 87, Disperse Red 91, Disperse Red 92, Disperse Red 93, Disperse Red 94, Disperse Red 96, Disperse Red 104, Disperse Red 116, Disperse Red 121, Disperse Red 127, Disperse Red 132, Disperse Red 133, Disperse Red 138, Disperse Red 150, Disperse Red 159, Disperse Red 162, Disperse Red 164, Disperse Red 165, Disperse Red 178, Disperse Red 189, Disperse Red 190, Disperse Red 191, Disperse Red 192, C.I. Disperse Violet 1, C.I. Disperse Violet 4, C.I. Disperse Violet 6, C.I. Disperse Violet 8, C.I. Disperse Violet 11, C.I. Disperse Violet 14, C.I. Disperse Violet 15, C.I. Disperse Violet 17, C.I. Disperse Violet 22, C.I. Disperse Violet 23, C.I. Disperse Violet 25, C.I. Disperse Violet 26, C.I. Disperse Violet 27, C.I. Disperse Violet 28, C.I. Disperse Violet 29, C.I. Disperse Violet 31, C.I. Disperse Violet 34, C.I. Disperse Violet 35, C.I. Disperse Violet 36, C.I. Disperse Violet 37, C.I. Disperse Violet 38, C.I. Disperse Violet 41, C.I. Disperse Violet 44, C.I. Disperse Violet 51, C.I. Disperse Violet 56, C.I. Disperse Violet 57, C.I. Disperse Violet 59, C.I. Disperse Blue 1, C.I. Disperse Blue 2, C.I. Disperse Blue 3, C.I. Disperse Blue 5, C.I. Disperse Blue 6, C.I. Disperse Blue 7, C.I. Disperse Blue 8, C.I. Disperse Blue 9, C.I. Disperse Blue 13, C.I. Disperse Blue 14, C.I. Disperse Blue 16, C.I. Disperse Blue 17, C.I. Disperse Blue 18, C.I. Disperse Blue 19, C.I. Disperse Blue 23, C.I. Disperse Blue 24, C.I. Disperse Blue 26, C.I. Disperse Blue 27, C.I. Disperse Blue 28, C.I. Disperse Blue 31, C.I. Disperse Blue 32, C.I. Disperse Blue 34, C.I. Disperse Blue 35, C.I. Disperse Blue 39, C.I. Disperse Blue 40, C.I. Disperse Blue 45, C.I. Disperse Blue 51, C.I. Disperse Blue 52, C.I. Disperse Blue 53, C.I. Disperse Blue 54, C.I. Disperse Blue 55, C.I. Disperse Blue 56, C.I. Disperse Blue 60, C.I. Disperse Blue 61, C.I. Disperse Blue 62, C.I. Disperse Blue 63, C.I. Disperse Blue 64, C.I. Disperse Blue 65, C.I. Disperse Blue 66, C.I. Disperse Blue 68, C.I. Disperse Blue 70, C.I. Disperse Blue 72, C.I. Disperse Blue 73, C.I. Disperse Blue 76, C.I. Disperse Blue 77, C.I. Disperse Blue 80, C.I. Disperse Blue 81, C.I. Disperse Blue 83, C.I. Disperse Blue 84, C.I. Disperse Blue 86, C.I. Disperse Blue 87, C.I. Disperse Blue 89, C.I. Disperse Blue 90, C.I. Disperse Blue 91, C.I. Disperse Blue 93, C.I. Disperse Blue 95, C.I. Disperse Blue 97, C.I. Disperse Blue 98, C.I. Disperse Blue 99, C.I. Disperse Blue 103, C.I. Disperse Blue 104, C.I. Disperse Blue 105, C.I. Disperse Blue 107, C.I. Disperse Blue 108, C.I. Disperse Blue 109, C.I. Disperse Blue 111, C.I. Disperse Blue 112, C.I. Disperse Blue 113, C.I. Disperse Blue 114, C.I. Disperse Blue 115, C.I. Disperse Blue 116, C.I. Disperse Blue 117, C.I. Disperse Blue 118, C.I. Disperse Blue 119, C.I. Disperse Blue 123, C.I. Disperse Blue 126, C.I. Disperse Blue 127, C.I. Disperse Blue 131, C.I. Disperse Blue 134, C.I. Disperse Blue 136, C.I. Disperse Blue 140, C.I. Disperse Blue 141, C.I. Disperse Blue 143, C.I. Disperse Blue 144, C.I. Disperse Blue 145, C.I. Disperse Blue 147, C.I. Disperse Blue 150, C.I. Disperse Blue 151, C.I. Disperse Blue 152, C.I. Disperse Blue 153, C.I. Disperse Blue 154, C.I. Disperse Blue 155, C.I. Disperse Blue 156, C.I. Disperse Blue 158, C.I. Disperse Blue 159, C.I. Disperse Blue 160, C.I. Disperse Blue 161, C.I. Disperse Blue 162, C.I. Disperse Blue 163, C.I. Disperse Blue 164, C.I. Disperse Blue 166, C.I. Disperse Blue 167, C.I. Disperse Blue 168, C.I. Disperse Blue 169, C.I. Disperse Blue 170, C.I. Disperse Blue 172, and C.I. Disperse Green 2, 5, or 6. Examples of water-insoluble naphthoquinone dyes include C.I. Disperse Blue 20 and C.I. Disperse Blue 58.

In an embodiment, the water-insoluble dye contains one, two, three, or more amino groups. An example of a water-insoluble anthraquinone dye having amino groups is C.I. Solvent Blue 63, or Japan Blue No. 403, available from Kishi Kasei Co., Ltd., Tokyo, Japan.

The water-insoluble quinone dye is present dissolved in any of the embodiments of the ink composition, which is a single phase composition. The dye may dissolve in any one of the solvents present in the ink composition or in the mixture of solvents present in the ink composition, or in the combination of solvents and other components of the ink combination.

The water-insoluble quinone dye can be present in the ink composition in any suitable amount, for example, in an amount up to about 5%, preferably from about 0.1 to about 3%, more preferably from about 0.2 to about 2%, and even more preferably from about 0.5 to about 1%, by weight of the ink composition.

Any suitable organic solvent can be used, preferably volatile organic solvents, e.g., solvents having a boiling point of less than 100° C., particularly less than 85° C. In an embodiment, the one or more organic solvents may be selected from the group consisting of ketones, alcohols, esters, and ethers, e.g., glycol ethers. Any suitable ketone can be used, for example, a lower alkyl ketone such as acetone or methyl ethyl ketone, or a cyclic ketone such as cyclohexanone. Examples of esters include alkyl esters such as ethyl acetate, ethyl propionate, ethyl lactate, propyl acetate, and butyl acetate. Examples of alcohols include lower alkyl alcohols such as methanol, ethanol, propanol, isopropanol, and butanol. Examples of glycol ethers include ethylene glycol monomethyl ether, diethylene glycol monomethyl ether, diethylene glycol monobutyl ether, triethylene glycol monomethyl ether, triethylene glycol monobutyl ether, dipropylene glycol monomethyl ether, dipropylene glycol monobutyl ether, tripropylene glycol monomethyl ether, and tripropylene glycol monobutyl ether. A mixture of one, two, three, or more organic solvents can be employed.

The organic solvent or a mixture of organic solvents can be present in any suitable amount, for example, in an amount greater than 50% by weight, preferably from about 60% to about 90%, more preferably from about 70% to about 80%, by weight of the embodiments of the ink composition. In a specific embodiment, the ink composition includes a mixture of a more volatile solvent (e.g., a solvent having a boiling point about 56° C.) and a less volatile solvent (e.g., a solvent having a boiling point about 145° C.), for example, a mixture of a more volatile ketone solvent and a less volatile glycol ether solvent. Thus, for example, the ink composition can include a mixture of acetone and propyleneglycol methyl ether.

Where a mixture of solvents is used, the mixture can contain any suitable proportion of the solvents. For example, in a mixture containing one or more volatile solvents (e.g., boiling point less than 85° C.) and one or more less volatile solvents (e.g., boiling point less than 200° C.), the weight ratio of the more volatile solvent or solvents to the less volatile solvent or solvents can be about 90/10, about 80/20, about 70/30, about 60/40, about 50/50, about 40/60, or about 30/70, preferably about 90/10, about 80/20, or about 70/30, or any ratio there-between.

The ink composition of the invention is free or substantially free of water. For example, if water is present, it can be present in an amount less than about 40%, such as less than about 30% or about 20%, preferably less than about 10% or about 5%, and even more preferably less than about 2% or about 1%, by weight of the ink composition. Any suitable amount of water can be present so long as the ink composition is a single phase composition, i.e., it does not form an emulsion or precipitate.

The ink composition of the invention contains one or more solvent-soluble binder resins, i.e., resins that are soluble in the organic solvent or the mixture of organic solvents. Any suitable solvent-soluble binder resin or resins can be employed. Examples of solvent-soluble binder resins include cellulosic resins, acrylic resins, styrene-acrylic resins, styrene-maleic anhydride resins, vinyl resins such as polyvinyl chloride, polyvinyl acetate or polyvinyl alcohol resins, rosin resins, silicone resins, phenolic resins, novolac resins, ketone resins, aldehyde resins, polyester resins, polyamide resins, polyimide resins, terpene resins, alkyd resins, polyurethane resins, ketal resins, epoxy resins, chlorinated rubber, shellac, and Saran resin.

In an embodiment, the solvent-soluble binder resin preferably contains functional groups that can interact with the quinone dye thereby increasing the solubility or stability of the dye in the ink composition. For example, the binder resin contains an aromatic group or a polar functional group such as hydroxyl and/or carboxyl groups. For example, in an embodiment, the solvent-soluble binder resins can be selected from the group consisting of solvent soluble cellulosic resins and solvent soluble polystyrene or styrene-acrylic copolymer resins.

Any suitable cellulosic resin can be employed, for example, a cellulose ester or an alkylcellulose. Cellulose ester is cellulose some or all of whose hydroxyl groups have been modified to have an ester function or mixed ester functions, e.g., by one or more ester groups wherein the ester group has 2-8 carbon atoms, preferably 2-5 carbon atoms. Examples of cellulose ester include cellulose mixed esters such as acetate butyrate and cellulose acetate propionate. An example of a suitable cellulose ester is cellulose acetate butyrate available commercially as CAB 551-0.01 from Eastman Chemical, Kingsport, Tenn. The alkylcellulose is cellulose some or all of whose hydroxyl groups have been modified to contain an alkyl group of 1-8 carbon atoms, preferably 2-4 carbon atoms, e.g., ethylcellulose. Nitrocellulose can also be employed as a cellulosic resin.

Any suitable acrylic resin or styrene-acrylic resin can be used. In the styrene-acrylic resin, the acrylic monomer can be an acrylic ester or acrylic acid, for example a copolymer of styrene and acrylic monomer having an acid number of from 0 to about 200, preferably from about 10 to about 100. Examples of solvent-soluble styrene-acrylic resins are JON-CRYL™ 586 and JONCRYL 611 resins available from S.C. Johnson Co., Racine, Wis. In a specific embodiment, the ink composition includes cellulose acetate butyrate and styrene-acrylic resin as solvent-soluble binder resins.

The solvent-soluble binder resin or resins can be present in the ink composition in any suitable amount, for example, in an amount of about 3% or more, such as from about 5 to about 25% or more, preferably from about 10 to about 20%, and more preferably from about 12 to about 16% by weight of the ink composition. For example, where a mixture of two resins are employed, the resins can be present in any suitable proportion, e.g., about 20/80, about 25/75, about 30/70, about 40/60, or about 50/50 of the two resins by weight, or any proportion there-between.

In a particular embodiment of the invention, the ink composition contains acetone and propyleneglycol methyl ether as organic solvents, cellulose acetate butyrate and a styrene-acrylic resin as solvent-soluble binder resins, and C.I. Solvent Blue 63 as the quinone dye.

In a specific embodiment, the ink composition of the invention is an ink jet ink composition. The ink composition of the invention can include one or more additional ingredients for adjusting the viscosity, electrical conductivity, and/or speed of solvent evaporation. For use in continuous ink jet printers, the ink jet ink composition generally has the following characteristics: (1) a viscosity of from about 1.6 to about 7.0 cps at 25° C.; (2) an electrical resistivity of from about 50 to about 2000 ohm-cm; and (3) a sonic velocity of from about 1100 to about 1700 meters/second. Ink compositions for other applications may have higher viscosities. For example, in offset lithography, the ink composition can have a viscosity of 4-80 Pas, in flexography, 50-500 mPas, in gravure printing, 40-300 mPas, letterpress printing, 3-50 Pas, screen printing, 1-20 Pas, and in intaglio printing, 10-100 Pas.

For use in continuous ink jet printers, the ink composition generally includes a conductive agent. Any suitable conductivity agent can be used, for example, salts containing organic or inorganic cations and organic or inorganic anions, particularly lithium trifluoromethanesulfonate.

In an embodiment, the invention provides an ink composition, particularly an ink jet ink composition, that comprises, consists essentially of, or consists of, acetone in an amount of from about 65 to about 80% by weight, propyleneglycol methyl ether in an amount of from about 5 to about 20% by weight, a water-insoluble quinone dye in an amount of from about 0.5 to about 2%, preferably from about 0.5 to about 1%, cellulose acetate butyrate in an amount of from about 3 to about 9%, a styrene-acrylic resin in an amount of from about 6 to about 10%, and lithium trifluoromethanesulfonate in an amount of from about 0.5 to about 2%, preferably from about 0.7 to about 0.9%, by weight of the ink composition or ink jet ink composition.

The ink composition of the invention, particularly the ink jet ink composition of the invention, has a short ink dry time, for example, less than 2 seconds, preferably less than 1 second, and more preferably less than 0.5 second. The ink jet ink composition of the invention is stable for extended periods of time. The quinone dye does not precipitate out of solution. Further, embodiments of the ink composition are stable at −20° C. for a period of at least two weeks or more, at 5° C. for a period of at least four weeks or more, and at 52° C. for a period of at least twelve weeks or more.

Embodiments of the ink composition of the invention can also include one or more additional ingredients such as humectants, plasticizers, defoamers, surfactants, and adhesion promoters.

The present invention further provides a method of printing a desired image on a substrate comprising applying the ink composition of the invention to the substrate so as to produce the desired image. The ink can be applied by any suitable technique. Specifically, the invention provides a method of ink jet printing an image onto a substrate comprising projecting a stream of droplets of an ink jet ink composition, as described in any of the embodiments above, to the substrate and controlling the direction of the droplets so that the droplets form the desired printed image on the substrate. Examples of substrates include both porous substrates such as paper and other absorbent materials, as well as nonporous substrates such as plastics, metals, and glass.

The following examples further illustrate the invention but, of course, should not be construed as in any way limiting its scope.

EXAMPLE 1

This example illustrates ink jet ink compositions in accordance with an embodiment of the invention.

| Ingredients | Formulation No. 1, wt % | Formulation No. 2, wt % | Formulation No. 3, wt % |
| --- | --- | --- | --- |
| Acetone | 72.0 | 72.0 | 76.3 |
| Propyleneglycol methyl ether | 10.0 | 10.0 | 10.0 |
| Lithium trifluoromethanesulfonate (FC-122) | 0.9 | 0.9 | 0.9 |
| Cellulose Acetate Butyrate (CAB 551-0.01) | 8.3 | 8.3 | 4.0 |
| JONCRYL 586 | 8.0 | | 8.0 |
| JONCRYL 611 | | 8.0 | |
| Japan Blue No. 403 | 0.8 | 0.8 | 0.8 |
| Total | 100 | 100 | 100 |

The ink jet ink compositions above are stable at −20° C., 5° C., and 52° C., for a period of two weeks or more, four weeks or more, and twelve weeks or more, respectively.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An ink jet ink composition comprising one or more organic solvents, one or more solvent-soluble binder resins, and a water-insoluble quinone dye, wherein the quinone dye is present in the ink composition in a dissolved state and the ink composition is a single phase ink composition, and wherein the quinone dye is selected from C.I. Solvent Blue 12, C.I. Solvent Blue 14, C.I. Solvent Blue 15, C.I. Solvent Blue 16, C.I. Solvent Blue 20, C.I. Solvent Blue 45, C.I. Solvent Blue 58, C.I. Solvent Blue 63, C.I. Solvent Blue 65, and C.I. Solvent Blue 76.

2. The ink composition of claim 1, wherein the water-insoluble quinone dye an anthraquinone dye containing one or more amino groups.

3. The ink composition of claim 2, wherein the water-insoluble anthraquinone dye is C.I. Solvent Blue 63.

4. The ink composition of claim 1, wherein the one or more organic solvents are selected from the group consisting of ketones, alcohols, esters, and glycol ethers.

5. The ink composition of claim 4, wherein one of the one or more organic solvents is a ketone.

6. The ink composition of claim 5, wherein the ketone is acetone.

7. The ink composition of claim 1, wherein the one or more solvent-soluble binder resins are selected from the group consisting of cellulosic resins, acrylic resins, styrene-acrylic resins, styrene-maleic anhydride resins, vinyl resins, rosin resins, silicone resins, phenolic resins, ketone resins, and aldehyde resins.

8. The ink composition of claim 7, wherein the cellulosic resin is a cellulose ester, an alkylcellulose, or nitrocellulose.

9. The ink composition of claim 8, wherein the cellulose ester is cellulose acetate butyrate or cellulose acetate propionate.

10. The ink composition of claim 8, wherein the alkylcellulose is ethylcellulose.

11. The ink composition of claim 1, which includes cellulose acetate butyrate and a styrene-acrylic resin as solvent-soluble binder resins.

12. The ink composition of claim 5, which also includes a glycol ether as an organic solvent.

13. The ink composition of claim 12, wherein the glycol ether is propyleneglycol methyl ether.

14. The ink composition of claim 1, which contains acetone and propyleneglycol methyl ether as organic solvents, cellulose acetate butyrate and a styrene-acrylic resin as solvent-soluble binder resins, and C.I. Solvent Blue 63 as the anthraquinone dye.

15. The ink composition of claim 1, which has the properties of: (1) a viscosity of from about 1.6 to about 7.0 cps at 25°

C.; (2) an electrical resistivity of from about 50 to about 2000 ohm-cm; and (3) a sonic velocity of from about 1100 to about 1700 meters/second.

16. The ink composition of claim 1, further including a conductivity agent.

17. The ink composition of claim 1, wherein the conductivity agent is lithium trifluoromethanesulfonate.

18. The ink composition of claim 1, wherein the one or more organic solvents are selected from the group consisting of ketones, alcohols, esters, and glycol ethers.

19. The ink composition of claim 1, wherein the one or more solvent-soluble binder resins are selected from the group consisting of cellulosic resins, acrylic resins, styrene-acrylic resins, styrene-maleic anhydride resins, vinyl resins, rosin resins, silicon resins, phenolic resins, ketone resins, and aldehyde resins.

20. The ink composition of claim 1, which contains acetone and propyleneglycol methyl ether as organic solvents, cellulose acetate butyrate and a styrene-acrylic resin as solvent-soluble binder resins, and C.I. Solvent Blue 63 as the quinone dye.

21. A method of ink jet printing an image onto a substrate comprising projecting a stream of droplets of an ink jet ink composition to the substrate and controlling the direction of the droplets so that the droplets form the desired printed image on the substrate, wherein the ink jet ink composition comprises one or more organic solvents, one or more solvent-soluble binder resins, and a water-insoluble quinone dye, wherein the quinone dye is present in the ink jet ink composition in a dissolved state and the ink jet ink composition is a single phase ink jet ink composition, and wherein the quinone dye is selected from C.I. Solvent Blue 12, C.I. Solvent Blue 14, C.I. Solvent Blue 15, C.I. Solvent Blue 16, C.I. Solvent Blue 20, C.I. Solvent Blue 45, C.I. Solvent Blue 58, C.I. Solvent Blue 63, C.I. Solvent Blue 65, and C.I. Solvent Blue 76.

22. The method of claim 21 wherein the quinone dye is C.I. Solvent Blue 63.

23. The method of claim 21 wherein one of the one or more organic solvents is a ketone.

24. An ink jet ink composition comprising one or more organic solvents, one or more solvent-soluble binder resins, and a water-insoluble quinone dye, wherein the quinone dye is present in the ink composition in a dissolved state and the ink composition is a single phase ink composition, wherein the one or more organic solvent comprises a ketone and a glycol ether.

25. The composition of claim 24 wherein the quinone dye is selected from C.I. Solvent Blue 12, C.I. Solvent Blue 14, C.I. Solvent Blue 15, C.I. Solvent Blue 16, C.I. Solvent Blue 20, C.I. Solvent Blue 45, C.I. Solvent Blue 58, C.I. Solvent Blue 63, C.I. Solvent Blue 65, and CI. Solvent Blue 76.

* * * * *